No. 616,321. Patented Dec. 20, 1898.
E. T. HARRIS.
CONTINUOUS BRICK KILN.
(Application filed May 28, 1898.)
(No Model.) 3 Sheets—Sheet 1.

WITNESSES:
Jos. A. Ryan
Edw. W. Byrn

INVENTOR
Edwin T. Harris.
BY Munn & Co.
ATTORNEYS.

No. 616,321. Patented Dec. 20, 1898.
E. T. HARRIS.
CONTINUOUS BRICK KILN.
(Application filed May 28, 1898.)

(No Model.) 3 Sheets—Sheet 2.

WITNESSES: Jos. A. Ryan, Edw. W. Byrn.

INVENTOR Edwin T. Harris
BY Munn & Co.
ATTORNEYS.

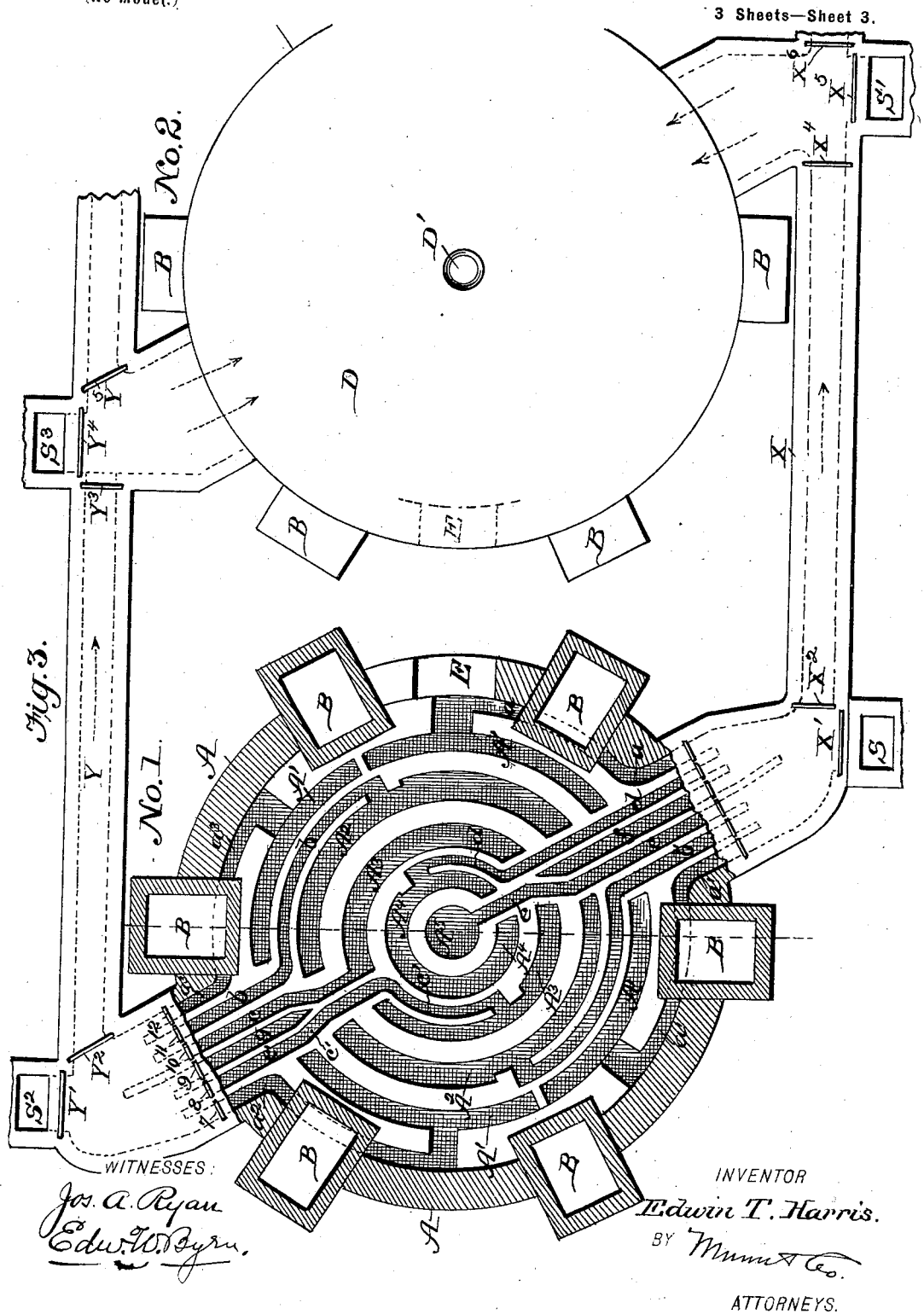

UNITED STATES PATENT OFFICE.

EDWIN T. HARRIS, OF RIDGWAY, PENNSYLVANIA, ASSIGNOR OF ONE-HALF TO FRANK G. EARLEY, OF SAME PLACE.

CONTINUOUS BRICK-KILN.

SPECIFICATION forming part of Letters Patent No. 616,321, dated December 20, 1898.

Application filed May 28, 1898. Serial No. 682,023. (No model.)

*To all whom it may concern:*

Be it known that I, EDWIN T. HARRIS, of Ridgway, in the county of Elk and State of Pennsylvania, have invented a new and useful Improvement in Continuous Brick-Kilns, of which the following is a specification.

My invention is in the nature of a continuous brick-kiln formed of a series of separate kilns connected by suitable underground trunk-flues arranged so that a part of the kilns may be burning while the others are being filled or relieved of their burned bricks and in which the heat of one kiln after it is burned may be utilized to "water-steam" or dry out the bricks in the next kiln to be burned in a very simple and economical manner.

The objects of my invention are to definitely control the furnace-draft through any and every portion of a kiln at will, and also to water-steam or to dry out the green bricks with a smaller loss from the crumbling and disintegration of the bricks; and to these ends it consists in the peculiar construction and arrangement of the kilns and flues, as will be hereinafter fully described, with reference to the drawings, in which—

Figure 1:
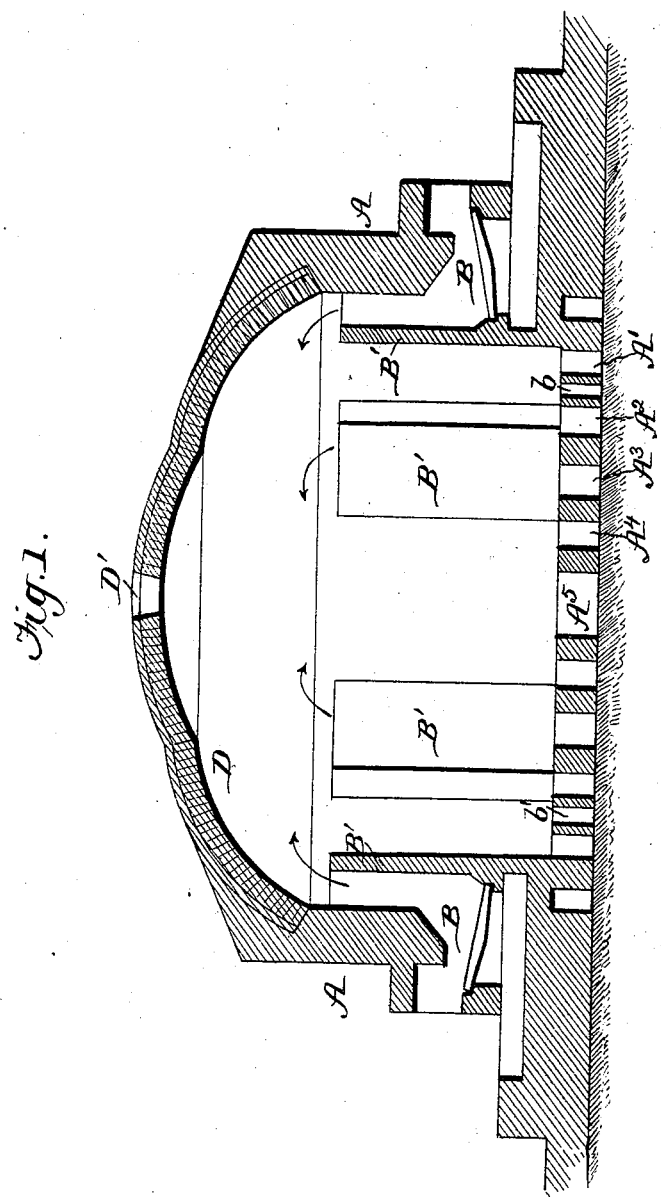
Figure 2:
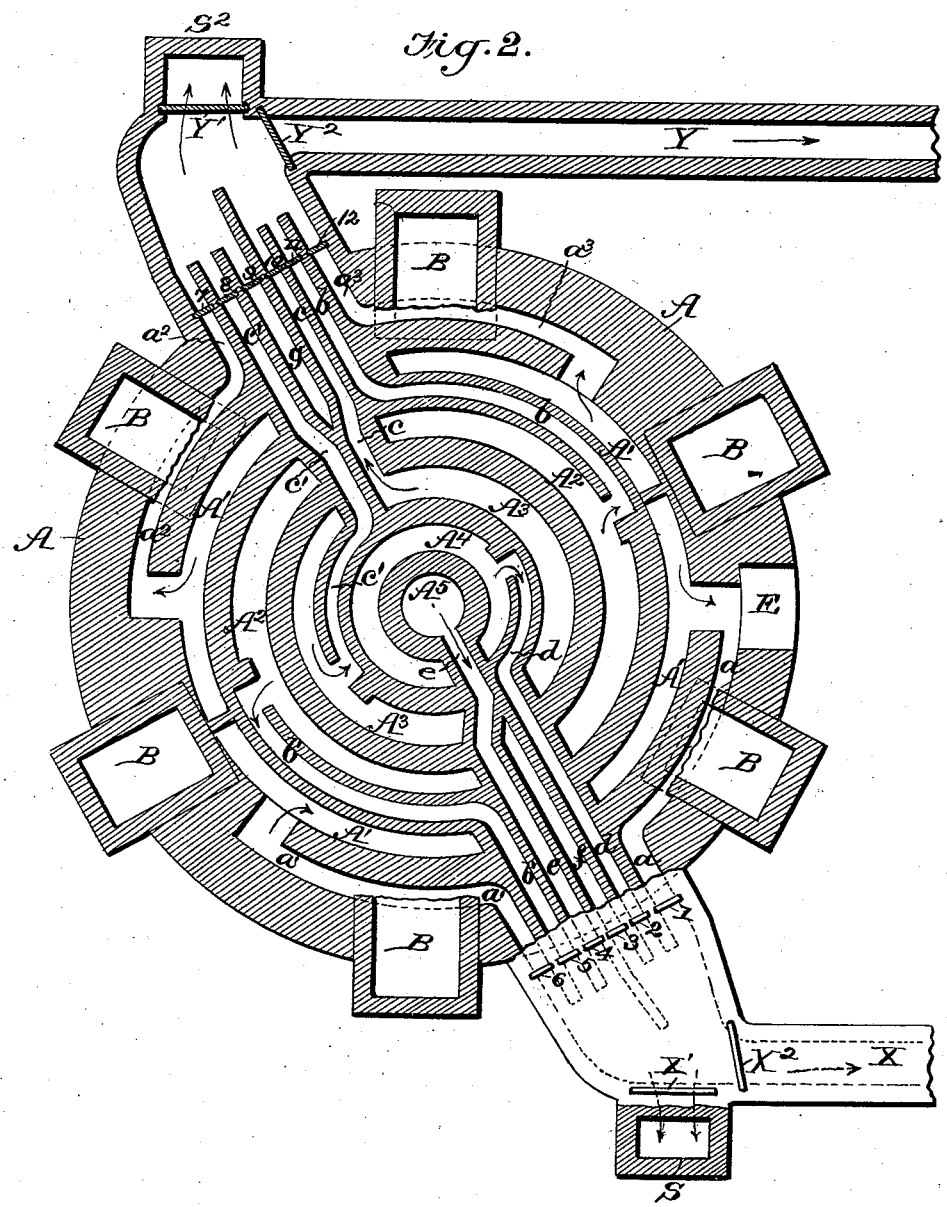

Figure 1 is a vertical central section of one of the kilns; Fig. 2, a horizontal section, in ground plan, through the flues in the floor of the kiln; and Fig. 3, a similar view, on a smaller scale, showing two of the kilns with their connecting-flues.

In the drawings, A represents the outer wall of the kiln, which is circular and is covered over by a dome constructed of a compound arch D, having an escape-vent D' at the top. At suitable intervals around the kiln, as shown in Fig. 2, there are built in the outer wall furnaces B, having (see Fig. 1) bag-walls B', extending nearly to the top of the kiln, so that the flame and hot products of combustion enter the kiln at the top and, striking the first low arch of the dome, are deflected down upon the bricks, which are stacked up in checker-work style nearly to the arch of the dome, leaving as little dead-air space above the bricks as possible.

In the floor of the kiln are formed a series of concentric flues $A' A^2 A^3 A^4 A^5$. The outer or larger flue $A'$, by virtue of its greatest size, has the greatest number of branch outlets—four in number, as shown at $a\ a'\ a^2\ a^3$, two of which, $a$ and $a'$, are taken off at one side of the kiln to the stack S and main trunk X, connecting the kilns, and the other two of which, $a^2\ a^3$, are taken off on the other side of the kiln to the stack $S^2$ and the main trunk Y, connecting the kilns on the other side. The next inner, parallel, and concentric flue $A^2$ has two branch outlets $b$ and $b'$, of which $b'$ is taken off at one side to connect with the stack S and main trunk X, and the other one, $b$, is taken off at the other side to the other stack $S^2$ and main trunk Y. The next inner and parallel concentric flue $A^3$ has also two branches $c\ c'$, both of which are taken off to the stack $S^2$ and main trunk Y, and the next smaller concentric flue $A^4$ and the central well $A^5$ have each a single branch flue $d$ and $e$, both of which are taken off to the stack S and main trunk X. There is also an independent branch flue $f$ on one side and another one, $g$, on the other side, arranged at the point of convergence between the branch flues $d\ e$ on one side and the branch flues $c\ c'$ on the other to break up what would otherwise be a too broad floor-space having no draft-outlet. One of these flues, $f$, communicates with the stack S and main trunk X on one side and the other, $g$, communicates with the stack $S^2$ and main trunk Y on the other side. Each one of these branch flues $a\ d\ f\ e\ b'\ a'$ has an independent damper 1 2 3 4 5 6, that controls its connection with the stack S and trunk X on one side, and the corresponding branch flues $a^2\ c'\ g\ c\ b\ a^3$ have independent dampers 7 8 9 10 11 12, which control their connection with the stack $S^2$ and trunk Y on the other side.

The bricks are put into and taken out of the kiln through a door E and are stacked up in the usual checker-work fashion over the floor-flues, so that the heat and products of combustion delivered into the top of the kiln from the numerous furnaces surrounding the same will pass down through the bricks and into the concentric flues and thence emerge through the branch flues either into the stacks or through the main-trunk flues into the next kiln.

The principal object of the arrangement of flues and dampers as thus described is to permit the fire-draft to be carried through the kiln with absolute uniformity, the largest concentric flue on the outside having a large number of branch flues to provide for the large area that it underlies and the smaller ones decreasing in branch flues to the center according to their diminishing areas. Then, again, each circular belt or area controlled by each circular flue is capable of being absolutely cut off by the individual branch flues and dampers from every other circular belt in the kiln, so that I am enabled to throw all the heat into an outside area in the kiln or all into the central area or all into any one of the intermediate areas or adjust all for an equal draft, and thus regulate the burning of the contents of the kiln with absolute certainty and accuracy. By peep-holes suitably arranged any dark spots indicating defective burning may be observed and the dampers adjusted to increase the draft at such point. It will be seen that by this arrangement also, while the draft may be thrown to or from the center at any desired area or belt, all portions are controlled from two points in the kiln, where the branch flues are brought together, carried through the side of the kiln, and provided with their respective dampers.

At the point where the branch flues emerge from the kiln they all unite and communicate with the stacks through dampers $X'$ and $Y'$ or with the main trunks through separate dampers $X^2$ $Y^2$.

The operation of the kiln is as follows: The heat from the furnace passes up and over the bag-walls $B'$, entering the kiln at the top, and, passing down through the bricks with an even distribution regulated by the dampers in the branch flues, passes to the two stacks S and $S^2$, the stack-dampers X $Y'$ being open and the trunk-dampers $X^2 Y^2$ being closed. There is thus a direct, strong, and uniformly-distributed draft through the bricks, which very quickly and uniformly burns the same. While the bricks are being burned in the kiln No. 1, (see Fig. 3,) the kiln No. 2 is filled with green bricks, and as soon as the bricks in kiln No. 1 are burned the residual heat remaining in this kiln is utilized to water-steam the green bricks in kiln No. 2 as follows: The stack-dampers $X'$ $Y'$ and $X^5 Y^4$ are closed, and the trunk-dampers $X^2 Y^2$ and $X^4 Y^3$ are open, and trunk-dampers $X^6 Y^5$ are closed. The hot currents from kiln No. 1 pass into the branch flues of the kiln No. 2, and thence pass into the circular flues and up through the bricks to the top of the kiln and out the top of the kiln through opening $D'$, which is uncovered while drying out the bricks. The residual heat now of kiln No. 1 passes through kiln No. 2 to water-steam or dry out the bricks; but this important fact must be noticed that in this process of water-steaming the green bricks the heat passes in opposite direction from that in which it passes in burning—i. e., in burning the heat passes down through the bricks, but in this water-steaming or drying-out operation the heat passes from the bottom to the top of the kiln. This is a matter of great practical importance, for when green bricks are water-steamed in a kiln by a downdraft from top to bottom the water evaporated from the upper layers of bricks is carried through the relatively colder layers underneath and, there condensing, adds so much additional water that they become soft, and as the lower strata of bricks carry the superincumbent weight of those above this softening of them, together with the weight on them causes, them to mash down and disintegrate, producing a large percentage of bats and broken bricks and a consequently large loss in the output. When water-steamed by hot currents passing upward, this is avoided, because the evaporated water carried by the hot gases is carried to the upper layers, which do not have so much crushing weight to sustain, and consequently they do not crumble, but are in due time dried as whole bricks.

I only show two kilns connected; but it will be understood that I may have a series of them, comprehending any desired number, depending upon the size of the plant.

One great advantage of my construction of kiln is that by having two stacks with dampers arranged at diametrically opposite points of each kiln communicating with the branch flues and the two trunk-flues connecting, through dampers, with the stacks and branch flues of a series of kilns in tangential relation I am enabled to use the residual heat of one kiln to water-steam not only the next kiln, but any kiln in the series, and, furthermore, by bringing one half of the branch flues out at one side of the kiln and the other half out at the other each branch flue at the point where it communicates with the stack is provided with an independent damper accessible from the exterior, whereby the draft may be distributed and controlled through any part of the kiln at will. This is a great advantage, as it often happens that it is desirable to burn in the same kiln two or more different kinds of goods at different degrees of heat, all of which is rendered possible by my construction and arrangement of kiln. Furthermore, the dampers of the branch flues, being external to the kiln, are removed from the destructive agency of the heat.

Having thus described my invention, what I claim as new, and desire to secure by Letters Patent, is—

1. A brick-kiln having in its floor a series of concentric main flues of a length increasing outwardly, the longer or outermost flues having a greater number of branch flues than the innermost ones, and one portion of said branch flues being carried out to one side of the kiln and provided with individual dampers, and the other portion of said branch flues being carried out to the other side of the kiln and provided with individual dampers, and two stacks for each kiln one arranged on one side, and the other on the other side of the kiln and communicating through a main damper with the branch flues of the kiln substantially as shown and described.

2. A series of brick-kilns having in their floors a series of concentric main flues of a length increasing outwardly, the longer or outermost main flues having a greater number of branch flues than the innermost ones, said branch flues being carried out to one side of the kiln and provided with individual dampers, a stack arranged outside of the kiln and communicating through a main damper with the branch flues of the kiln, and a main trunk communicating with the several kilns at a point between the dampers of the stacks and the individual dampers of the branch flues, and trunk-flue dampers arranged at the said points of communication substantially as and for the purpose described.

3. A series of brick-kilns having in their floors a series of concentric main flues of a length increasing outwardly, the longer or outermost main flues having a greater number of branch flues than the innermost ones, and one portion of said branch flues being carried out to one side of the kiln and provided with individual dampers and the other portion of said branch flues being carried out to the other side of the kiln and provided with individual dampers, two stacks for each kiln arranged on opposite sides of the same and having each a damper communicating with their respective sets of branch flues, and two trunk-flues with dampers connecting the several kilns of the series on opposite sides, and communicating with the kilns at a point between the stack-dampers and the individual dampers of the branch flues substantially as and for the purpose described.

4. A brick-kiln having in its floor a series of concentric main flues, and a series of parallel alternating and concentric branch flues increasing in number for the main flues in an outward direction substantially as and for the purpose described.

EDWIN T. HARRIS.

Witnesses:
J. M. SCHRAM,
R. A. PARK.